United States Patent [19]

Walling

[11] Patent Number: 5,728,424
[45] Date of Patent: Mar. 17, 1998

[54] METHOD FOR FORMING A TEXTURED SURFACE ON A GEOMEMBRANE

[75] Inventor: Walter W. Walling, Houston, Tex.

[73] Assignee: GSE Lining Technology, Inc., Houston, Tex.

[21] Appl. No.: 631,848

[22] Filed: Apr. 10, 1996

[51] Int. Cl.⁶ .................... B05D 1/12; B05D 1/38
[52] U.S. Cl. ............ 427/180; 427/197; 427/202; 427/316; 427/365
[58] Field of Search .................. 427/180, 197, 427/202, 316, 365

[56] References Cited

U.S. PATENT DOCUMENTS

| | | | |
|---|---|---|---|
| 2,936,814 | 5/1960 | Yahubile | 427/180 |
| 3,622,422 | 11/1971 | Newman | 427/180 |
| 4,885,201 | 12/1989 | Brandt | 428/143 |
| 5,075,135 | 12/1991 | Brandt | 427/180 |
| 5,612,081 | 3/1997 | Orr et al. | 427/8 |

FOREIGN PATENT DOCUMENTS 2255292  4/1992  United Kingdom .

*Primary Examiner*—Michael Lusignan
*Assistant Examiner*—Fred J. Parker
*Attorney, Agent, or Firm*—Harrison & Egbert

[57] ABSTRACT

A system for forming a textured surface on a geomembrane including a support surface, a first set of rollers for passing the geomembrane onto the support surface such that a surface of the geomembrane faces upwardly, a heater positioned in proximity to the surface of the geomembrane so as to heat the geomembrane to a desired elevated temperature, a particle distributer positioned above the geomembrane so as to pass solid particles onto the surface of the geomembrane in a desired particle distribution. The particles can have a desired size and geometry as they are passed onto the surface of the geomembrane. A second set of rollers is positioned adjacent to the port surface so as to receive the geomembrane after the particles have been distributed thereon. The heater includes a preheater positioned on one side of the particle distributor and a postheater positioned on an opposite side of the particle distributor. The preheater serves to elevate a temperature of the surface of the geomembrane prior to receiving particles thereon. The postheater serves to bond the distributed particles onto the surface of the geomembrane.

7 Claims, 2 Drawing Sheets

METHOD FOR FORMING A TEXTURED SURFACE ON A GEOMEMBRANE

TECHNICAL FIELD

The present invention relates to systems and processes for providing the surface of a geomembrane with a textured surface. More particularly, the present invention relates to systems and processes for applying particles or projections onto a surface of a geomembrane so as to improve the friction coefficient between the surface of the geomembrane and an adjoining surface.

BACKGROUND ART

Geomembranes are frequently employed in excavation work, hydraulic engineering and civil engineering. These geomembranes can often be employed for separating solid regions. In such applications, it can be disadvantageous if the geomembrane should interrupt the frictional contact between these regions. It is known to counteract this disadvantage by providing one or both of the surfaces of the geomembrane with a large number of projections or recesses by embossing the geomembrane. This has the disadvantage in that the film structure is damaged. In addition, this process is quite expensive.

U.S. Pat. No. 4,885,201, issued on Dec. 5, 1989 to M. Brandt, and owned by the present assignee, describes a film made with a weldable polymer material with projections. The projections are formed by particles which are applied by spraying in a molten state onto the film surface. The welding factor is significantly below one. As described in this patent, the weldable polymer material means a material which can be bonded by welding two parts made from the same or another material if at least one of the two parts is at an elevated temperature. In general, this applies to a thermoplastic material. In this patent, the geomembrane is formed by throwing particles, in the molten state, against the surface of the geomembrane. The particles can be applied by free flight or fall with a speed such that the kinetic energy of the particles is sufficient to press them against the surface of the geomembrane upon impact. In addition, such molten particles will deform in order to create an adequate surface contact.

In this patent, the surface temperature of the film on impact of the particles is less than about 70° C. This figure applies to polyethylene. In the case of materials having a higher or lower melting point, the limit is correspondingly higher or lower. This causes the thermoloading of the film through welding to be low since it is the particles which provide the necessary heat of melting due to the relatively high inherent temperature. Additionally, it causes welding of the film to the particles to occur to only an incomplete extent, i.e. with welding factor significantly below one. As used herein, the welding factor means the ratio of the strength of the welded joint to the strength of the material, expressed as a fraction or as a percentage. Whereas, in general, in welding, a welding factor of as close to one as possible is desired, i.e. a welding zone strength which is similar to the strength of the base material. In this patent, a lower weld quality was desirable so that only a limited force can be exerted on the film during lateral shear stress of the particles welded to the film. If this force threshold is reached, the particle detaches from the film surface without damaging the film.

In this patent, it is described that the height of the projections is the distance that the projections protrudes over the film surface. This height is matched to the structure of the solid with which the projections are to interact. If the solid is a very coarsely grained film material, the projections may also be made relatively coarse. If, in contrast, the solid is a fine grain substance, for example sandy or loamy soil, small projections will suffice. In certain applications, it is sufficient to provide only one of the two film surfaces with roughened projections. However, in general, both film surfaces should be provided with the projections.

U.S. Pat. No. 5,075,135, issued on Dec. 24, 1991, to M. Brandt, and owned by the present assignee, also describes a process for providing the surface of a film with the weldable polymer material so as to form the projections. In this process, the film is produced by extruding the film material from the extruder nozzle onto the surface of the cooling drum. After adequate cooling and solidification, the film is removed from the drum and fed to a winding device. Upper and lower spray nozzles are positioned at a small distance from the drum. The material forming the projections is sprayed from the spray nozzles onto the film surface. The position of the nozzles is selected so that the surface of the film at the spraying point has the temperature suitable for achieving the desired welding factor.

One of the problems with this prior art process is the fact that the equipment required for the forming of the projections is relatively expensive. Additionally, it becomes very difficult to control the quality, size, geometry, and distribution of the particles on the surface of the geomembrane. Under certain circumstances, it is desirable to provide consistent geometry between the particles formed on the surface of the geomembrane. Control of the geometry of the particles is difficult to attain when the polymeric material is sprayed onto the surface of the geomembrane when the polymeric material is in a molten state. Additionally, it has been found that the spraying of the particles in the molten state requires a great deal of maintenance and repair of the spraying nozzles.

It is an object of the present invention to provide a textured surface on a geomembrane for improved frictional contact with an adjacent surface.

It is another object of the present invention to provide a process whereby the projections can be applied without melting.

It is another object of the present invention to provide a process which allows for particles of various colors, sizes and geometries to be applied to the geomembrane.

It is a further object of the present invention to provide a process which applies particles onto the geomembrane such that the particles adhere to the geomembrane with a welding factor of significantly less than one.

It is a further object of the present invention to provide a process which serves to reduce adsorption of radiant energy onto the membrane.

It is a further object of the present invention to provide a process which allows for the formation of a textured surface without changing the physical properties of the membrane.

It is still an additional object of the present invention to provide a process which forms a textured surface on a geomembrane which is very economical, safe and clean.

It is an additional object and advantage of the present invention to provide a process that can be incorporated into the standard geomembrane manufacturing processes.

These and other objects and advantages of the present invention will become apparent from a reading of the attached specification and appended claims.

SUMMARY OF THE INVENTION

The present invention is a method for forming a textured surface on a geomembrane comprising the steps of (1)

passing the geomembrane over a support surface; (2) heating a surface of the geomembrane; (3) distributing granules onto the heated surface of the geomembrane as the geomembrane passes over the support surface; (4) bonding the granules onto the heated surface of the geomembrane, and (5) passing the geomembrane from the support surface.

In the present invention, the step of bonding includes heating the surface of the geomembrane and the granules after the granules are distributed. Furthermore, the step of bonding can include passing the heated surface and granules between rollers so as to exert a compressive force onto the surface of the geomembrane. The granules are adhered to the surface of the geomembrane with a weld factor of significantly less than one. The steps of heating and the steps of bonding occur as the geomembrane passes over the support surface.

The process of the present invention further includes the steps of passing the geomembrane over a second support surface, heating an opposite surface of the geomembrane, distributing granules onto this heated opposite surface of the geomembrane, bonding the granules onto the heated opposite surface of the geomembrane, and passing the geomembrane from the second support surface. The granules, as used herein, are solid particles having a desired size and geometry. The particles are distributed in a desired particle distribution pattern.

The present invention is also a system for forming a textured surface on a geomembrane comprising a support surface, a first roller means for passing the geomembrane onto the support surface such that a surface of the geomembrane faces upwardly, a heater positioned in proximity to the surface of the geomembrane so as to heat the geomembrane to a desired elevated temperature, a distributor positioned above the geomembrane so as to pass particles onto a surface of the geomembrane, and a second roller positioned adjacent to the support surface so as to receive the geomembrane after the particles have been distributed thereon.

In the present invention, the heater includes a preheater positioned on one side of the distributor so as to elevate a temperature of the surface of the geomembrane prior to receiving particles thereon from the distributor. A postheater is positioned on an opposite side of the distributor from the preheater so as to bond the distributed particles onto the surface of the geomembrane. The preheater, the postheater and the distributor are positioned above the support surface. The first roller serves to pass the geomembrane between the support surface and the preheater, the postheater and the distributor.

The second roller includes a pair of rollers positioned in parallel relationship to each other and being an adjustable distance apart so as to control a pressure of the rollers onto the surface of the geomembrane passing therebetween.

The system of the present invention further includes a second support surface, a third roller for passing the geomembrane from the second roller such that an opposite surface of the geomembrane faces upwardly as the geomembrane passes over the support surface, a second heater positioned in proximity to the surface of the geomembrane so as to heat the opposite surface of the geomembrane to a desired temperature, and a second distributor positioned above the geomembrane for passing solid particles onto a surface of the geomembrane in a desired particle distribution pattern. A fourth roller is positioned on an opposite side of the second support surface from the third roller. The fourth roller serves to receive the geomembrane after it passes over the support surface.

The distributor may be a perforated cylinder which is rotatably positioned in a housing positioned above the support surface and a particle supply which is connected to the perforated cylinder so as to supply the particles to the cylinder. The cylinder rotates so as to distribute particles onto the heated surface of the geomembrane.

DETAILED DESCRIPTION OF THE INVENTION

Figure 1:
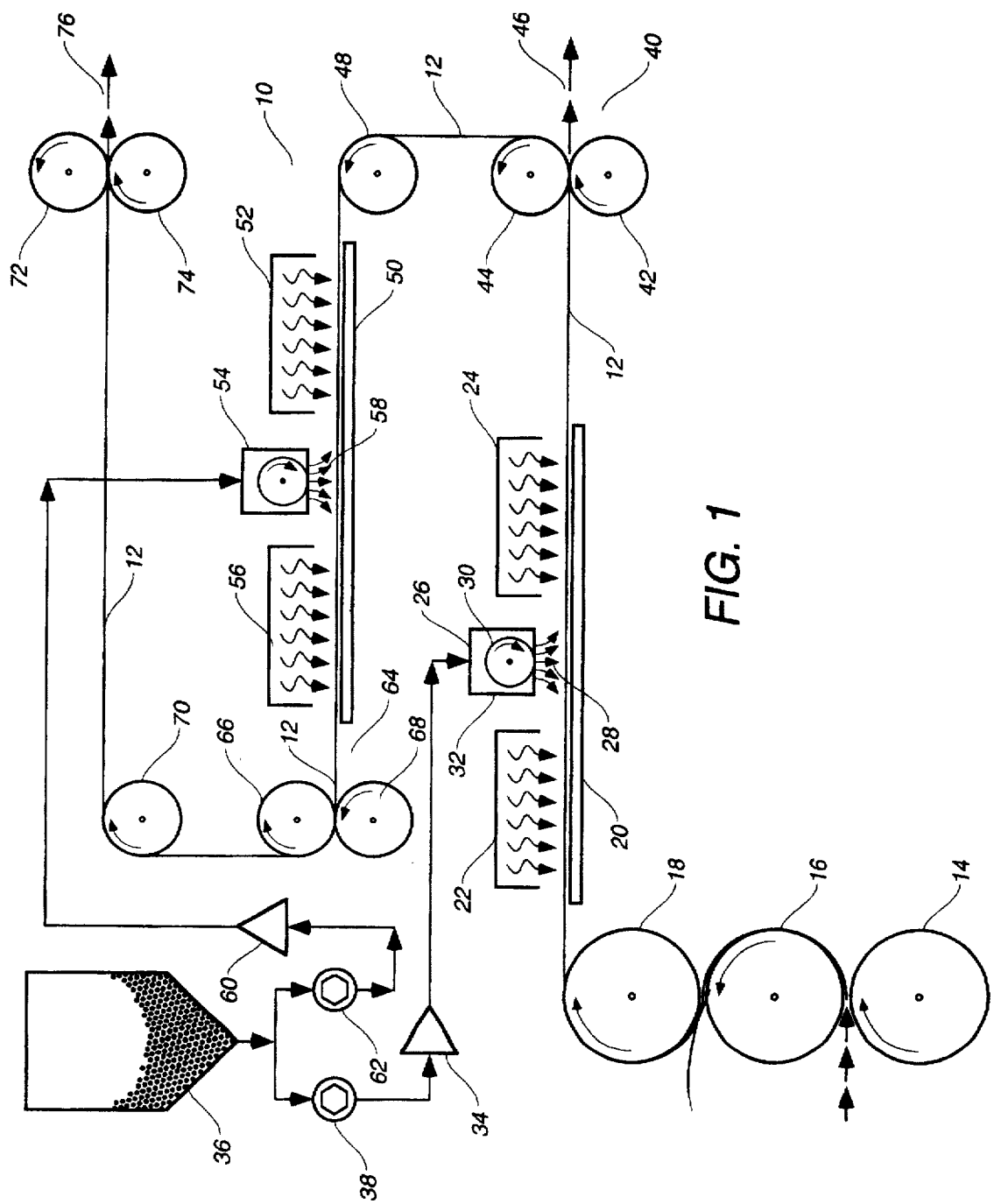
FIG. 1 is a diagrammatic illustration of the process in accordance with the teachings of the present invention.

Referring to FIG. 1, there is shown at 10 the process for the present invention for the manufacture of a geomembrane. In FIG. 1, the continuous line illustrates the path of a geomembrane 12 through the process of the present invention.

Initially, in the present invention, a smooth sheet of geomembrane enters the process between rollers 14 and 16. The geomembrane is a smooth sheet which can be formed from roll stock, flat cast sheet extrusions, calendar sheeting, or round die (blown film) sheeting. The rollers 14 and 16 serve to transport the smooth sheet supply through the system. Rollers 14 and 16 will cause the geomembrane to pass therebetween and upwardly, around roll 16 and over roll 18. These rolls may be heated or cooled to help establish the necessary or desired sheet temperature for texturing. Roll 18 is illustrated as having a top surface which is generally level with the support surface 20. The geomembrane will pass from the roll 18 over the top of the support surface 20 so that the preheater 22 and the postheater 24 may properly act on the top surface of the geomembrane 12. A distributor 26 is positioned between the preheater 22 and the postheater 24 so as to distribute particles or granules onto the top surface of the geomembrane 12.

The support surface 20 is positioned below the geomembrane 12 so as to assist in maintaining the necessary or desired position of the membrane 12 with respect to the distributor 26 and the preheater 22 and the postheater 24. The support mechanism may also incorporate or be interspersed with heating and/or cooling capabilities so as to help provide the necessary or desirable granulate-to-membrane bonding properties. The support surface 20 is a generally flat surface which is arranged such that the membrane 12 is interposed between the support surface 20 and the preheater 22, the postheater 24 and the distributor 26. Alternatively, the support surface 20 could also be a group of rollers which support the membrane 12.

The preheater 22 serves to elevate the temperature of the membrane 12 as it passes thereover. Under certain circumstances, the preheater 22 may not be required for certain types of plastics or to certain types of specifications. In general, however, the preheater 22 serves to elevate the temperature of the membrane 12 so that it is suitable for bonding with the particles which are distributed by the distributor 26.

The postheater 24 is positioned on the opposite side of the distributor 26 from the preheater 22. The postheater serves to provide or maintain the time/temperature cycle necessary to achieve the desired degree of bond (adhesion) between the granules (or particles) and the membrane 12 so as to produce the texture on the surface being treated. As was described in U.S. Pat. Nos. 4,885,201 or 5,075,135, it is desirable that the particles be joined to the surface of the membrane 12 such that the weld factor is significantly less than one.

In FIG. 1, it can be seen that the distributor 26 is positioned between the preheater 22 and the postheater 24 so as to distribute granular material 28 onto the top surface of the membrane 12. The granular material 28 is supplied so as to create the texture on the surface of the geomembrane 12. The granule size, type, color and geometry may be adjusted so as to vary the texture characteristics, friction appearance, etc. Additionally, mixtures of color, geometry, size and material may be used for distribution, in a desired pattern, onto the surface of the membrane 12.

The distributor 26 serves to apply the granular material 28 onto the top surface of the membrane 12. The distributor may or may not require incorporation of ventilation, atmosphere or temperature controls so as to provide a suitably designed environment for controlling the textured surface characteristics of the membrane 12.

As shown in FIG. 1, the distributor 26 includes a rotating perforated cylinder 30 which is rotatably mounted within a housing 32. As the cylinder 30 rotates, particles fall through the perforations in the cylinder 30 so as to fall to the surface of the membrane 12. This is one type of distributor that can be employed within the teachings of the present invention. It is believed that a wide variety of other distributing mechanisms can also be used for the distributing of the granules onto the membrane 12. The distributor 26 receives the granules from a conveying device 34. The conveying device 34 receives the granules from a container 36. The container 36 is a funnel-shaped container which delivers the particles through a metering device 38 into the conveyor 34. The container 36, the metering device 38 and the conveyor 34 are commercially available items. The conveyor 34 serves to deliver the supply of granules from container 36 into the rotating cylinder 30 within the distributor 26.

A second set of rollers 40 is provided on an end of the support surface 20 opposite the rollers 14, 16 and 18. The set of rollers 40 includes first roller 42 and second roller 44. The rollers 42 and 44 are arranged in parallel relationship such that the membrane 12 passes therebetween. The distance between the rollers 42 and 44 is adjustable so as to control the compressive force exerted by the surface of the rollers 42 and 44 upon the surface of the membrane 12. The roll surface and contact pressure may be designed so as to incorporate protection for the texture or to press the granules more tightly onto the membrane surface. For example, the roll surface of the rollers 40 might consist of radial "wire" fingers which are sized and spaced so as to minimize the ability to press the newly formed textured surface of the granules against the membrane face. Alternatively, the surfaces of the rollers 42 and 44 may be designed so as to maximize the pressure of the granules against the membrane face. The rollers 40 can be utilized for the purpose of further bonding the particles to the membrane face. Under certain circumstances, the rollers 42 and 44 can serve the purposes of the postheater 24 so as to effectively carry out the bonding of the particles to the membrane.

If it is only necessary to form a texture on a single side of the membrane 12, then the membrane can be discharged from the rollers 40 directly outwardly therethrough. Arrows 46 illustrate the discharge of the membrane 12 in this manner. Alternatively, if it is desired to put a textured surface on the opposite side of the membrane 12, then the membrane 12 will extend upwardly from the rollers 40 to a directional control roller 48. As can be seen, the orientation of the membrane 12 is reversed as it passes over the roller 48. In this manner, the membrane 12 is directed over another support surface 50 such that the textured surface of the membrane 12 faces the support surface 50 and the smooth untextured surface faces the second preheater 52, the distributor 54, and the postheater 56.

The preheater 52 has the same characteristics as the preheater 22. The preheater 52 is designed so as to elevate the temperature of the opposite side of the membrane 12 to a sufficient temperature so as to receive the particles 58 as distributed by the distributor 54. Similarly, the postheater 56 has the same characteristics as the postheater 24. The postheater 56 serves to facilitate the bonding of the particles onto the opposite face of the membrane 12. The distributor 54 is a similar distributor to that of distributor 26. The distributor 54 receives a granule supply from conveyor 60. Conveyor 60 receives its supply from the container 36 by way of the adjustable metering device 62. The distributor 54 will serve to distribute the granules 58 in a desired pattern and distribution onto the surface of the membrane 12.

After the particles 54 have been distributed on the opposite side of the membrane 12, the membrane 12 passes through another set 64 of rollers 66 and 68. Rollers 66 and 68 are arranged in parallel relationship such that the membrane 12 passes therebetween. The rollers 66 and 68 can be adjusted in the same manner as the rollers 42 for the purposes of further bonding the particles to the surfaces of the membrane 12. A directional control roller 70 receives the membrane 12 and serves to direct the membrane 12 outwardly through rollers 72 and 74. As can be seen by arrow 76, a membrane with texture on both sides is the output through the rollers 72 and 74. The rollers and the process of the present invention are installed at selected points so as to generate pressure on the granules, to control tension of the membrane 12, and to assure the transport of the membrane 12 through the process.

Figure 2:
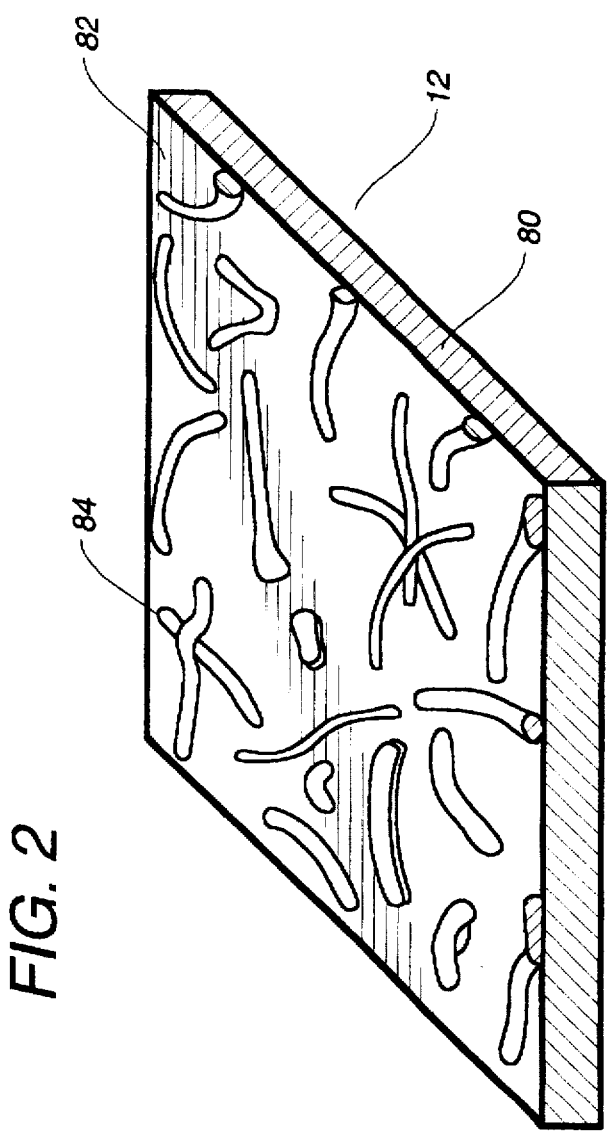
FIG. 2 is a perspective view showing an example of a section of geomembrane manufactured with the process of the present invention.

FIG. 2 shows, in detail, a portion 80 of the membrane 12 which is produced by the process of the present invention. The membrane 12 can be used for dump-sealing sheeting, dike-sealing sheeting, or for other earth-sealing applications. The membrane 12 can includes polyethylene or comparable materials. The thickness of the membrane 12 is in the order of two millimeters, although the process of the present invention can be used in membranes of significantly less or greater thicknesses.

On the upper surface 82 of the membrane 12, there is shown the particles 84 which are welded to the surface 82. These particles 84 have been applied by the process of the present invention. As illustrated in FIG. 2, the particles 84 have an irregular shape on the surface 82 of the section 80. The exact geometry, color, shape, and size of the particles 84 can be varied by changing the particles which are placed on the surface of the geomembrane through the distributors 26 and 54. The particles 84 are adhered to the surface 82 with a weld factor of significantly below one. As a result, the particles 84 will release from their bond with the surface 82 without damaging the membrane 12.

The present invention is an improved process for applying a textured finish to a previously smooth surfaced sheet or film (flexible thermoplastic geomembrane) for the purpose of increasing the friction between the plastic sheet or film and adjoining soils, clays or sands. These materials are used to form or construct an earthen structure utilizing the geomembrane 12 as one of the principal components intended to prohibit, control or significantly reduce the passage of fluids out of the containment.

The application of the particles 28 and/or 58 onto the surface of the geomembrane 12 may be used for the purpose of modifying the appearance of the sheet or film by changing the texture, color and/or reflectivity of radiant energy (heat, light and/or ultraviolet rays). The process of the present invention overcomes the problems associated with current processes for the forming of such textured surfaces. The current processes, commonly co-extrusion and pressure-atomized spray applications, allow only very limited control over the geometry of the texture. Such processes often limit or prohibit changing colors of the texturing material and, in some instances, are not readily adaptable to installation in series with existing sheet extrusion equipment so as to form a continuous process. The process of the present invention can be used to texture previously manufactured and quality certified sheets. Any co-extrusion processes cannot be used with such sheets since they tend to significantly reduce the tensile elongation and strength.

The process of the present invention allows improved control of texture particle geometry, reduces the problems associated with color selection, helps to maintain color consistency of the texture, and easily allows the texture to be applied continuously in series with or subsequent to the manufacture of the membrane. It is compatible with any known geomembrane film manufacturing process.

In the present invention, the process allows for the manufacturing of a rough textured surface on a previously smooth surface thermoplastic sheet so as to improve the friction of the sheet. The process formed the desired projections on the smooth surface of the geomembrane without melting the granulated materials. As a result, the original particle geometry is generally maintained. Other processes utilize molten materials and cannot, as readily, maintain a desired particle geometry.

This process can apply particles of various colors (e.g. white) without significant thermal degradation of colors other than black under the surface of the thermoplastic sheet or membrane. The process can apply and bond the particles of granulated material to a previously smooth surface while maintaining the basic geometry of the granule and maintaining the welding factor of less than one. The present invention allows for the application of mixtures or blends of particles of different colors without significant mixing, blending or dispersion of the individual colors. Additionally, the process allows for the application of particles of various controllable sizes and geometries onto the surface of the smooth geomembrane.

The present invention allows the application of a texture without significantly decreasing the physical properties of the geomembrane or increasing stress risers. Prior co-extrusion processes tended to create risers that significantly reduced the tensile strength and elongation at break. The present process provides tensile elongation at break equal to from 60 to 100% of the original smooth sheet elongation.

Since the present invention applies the particles to the surface of the membrane with a weld factor of less than one, the present process allows for the manufacture of a thermoplastic sheet that serves to improve the friction between the membrane and the adjacent soil so as to enhance slope stability but also allows the adjoining soil to move with respect to the membrane by shearing the projections from the sheet surface prior to tearing the membrane. As a result, the construction of the membrane in accordance with the process of the present invention avoids the destruction of the containment capability in the instance of significant displacement of the surrounding soil due to causes unrelated to the soil membrane interface.

The process of the present invention is cleaner, safer, more economical and practical than pressure atomization and spraying of molten polymer for the formation of roughened surfaces. The process applies this texture without affecting the minimum thickness, the physical properties or the other qualities attributable to the smooth geomembrane. Other processes, as used in the past, have commonly precluded accurate determination and demonstration of the true minimum thickness and of other properties of the membrane supporting the projections.

The foregoing disclosure and description of the invention is illustrative and explanatory thereof. Various changes in the details of the described process may be made within the scope of the appended claims without departing from the true spirit of the invention. The present invention should only be limited by the following claims and their legal equivalents.

I claim:

1. A method of forming a textured surface on a geomembrane comprising the steps of:

passing the geomembrane over a first support surface;

heating a surface of the geomembrane;

distributing granules onto the heated surface of the geomembrane as the geomembrane passes over said first support surface;

bonding said granules onto the heated surface of the geomembrane, said step of bonding comprising the steps of:

heating the surface of the geomembrane and said granules after said granules are distributed; and passing the heated surface and granules between rollers, said rollers exerting a compressive force onto the surface of the geomembrane such that said granules adhere onto said surface of the geomembrane with a weld factor of less than one; and passing the geomembrane from the first support surface.

2. The method of claim 1, said step of passing the geomembrane from the support surface comprising the steps of:

passing the geomembrane over a second support surface;

heating another surface of the geomembrane;

distributing granules onto the heated another surface of the geomembrane;

bonding said granules onto the heated another surface of the geomembrane; and passing the geomembrane from said second support surface.

3. The method of claim 2, said step of bonding comprising the step of:

heating said another surface of the geomembrane after the granules are distributed.

4. The method of claim 3, said step of bonding further comprising the step of:

passing the heated another surface and granules between rollers, said rollers exerting a compressive force onto the heated another surface of the geomembrane.

5. The method of claim 2, said step of bonding comprising the step of:

passing the heated another surface and granules between rollers, said rollers exerting a compressive force onto said another surface of the geomembrane.

6. The method of claim 1, said granules being solid particles during said step of distributing.

7. A method of forming a textured surface on a geomembrane comprising the steps of:

passing the geomembrane over a flat support surface;

heating a surface of the geomembrane;

distributing granules over the heated surface of the geomembrane as the geomembrane passes over said support surface;

bonding said granules onto the heated surface of the geomembrane, said step of heating and said step of bonding occurring as the geomembrane passes over said flat support surface; and passing the geomembrane from the support surface.

* * * * *